(12) United States Patent
Huang et al.

(10) Patent No.: US 7,035,094 B2
(45) Date of Patent: Apr. 25, 2006

(54) SUPPORT ASSEMBLY FOR A PORTABLE COMPUTER

(75) Inventors: Chao-Ming Huang, Taipei (TW); Wen-Chieh Wang, Taipei (TW); Chung-Gi Hsu, Taipei (TW)

(73) Assignee: Tatung Co., Ltd., Taipei (TW)

( * ) Notice: Subject to any disclaimer, the term of this patent is extended or adjusted under 35 U.S.C. 154(b) by 237 days.

(21) Appl. No.: 10/791,752

(22) Filed: Mar. 4, 2004

(65) Prior Publication Data

US 2004/0174671 A1    Sep. 9, 2004

(30) Foreign Application Priority Data

Mar. 7, 2003    (TW)    ............................. 92203514 U

(51) Int. Cl.
*G06F 1/16*    (2006.01)

(52) U.S. Cl. ...................................... 361/683; 361/686

(58) Field of Classification Search ................ 361/679, 361/683, 686
See application file for complete search history.

(56) References Cited

U.S. PATENT DOCUMENTS 6,239,969 B1 *   5/2001   Howell et al. ............... 361/686
6,590,767 B1 *   7/2003   Liao et al. .................. 361/686

* cited by examiner

*Primary Examiner*—Yean-Hsi Chang
(74) *Attorney, Agent, or Firm*—Bacon & Thomas, PLLC

(57) ABSTRACT

An support assembly for a portable computer has a plurality of magnetic devices with opposite magnetic poles deposited separately on a backside of the portable computer and a back support board of the extending base. When the portable computer is placed in the extending base, the magnetic attraction force positions the portable computer into a containing groove of the extending base.

7 Claims, 2 Drawing Sheets

SUPPORT ASSEMBLY FOR A PORTABLE COMPUTER

BACKGROUND OF THE INVENTION

1. Field of the Invention

The present invention relates to an support assembly for a portable computer and, more particularly, an support assembly utilizes a magnetic device to engage the portable computer each other.

2. Description of Related Art

Tablet PC (Personal Computer) have several desirable characteristics, such as portability, good performance, extending capacity, a smaller size and a lighter weight. However, compared to a standard computer, the tablet PC has simplified functionality. By connecting to an extending base, a greater number of functions may be extended. Furthermore, when a user desires to use the tablet PC as a desktop PC, the user needs to find an containing base to contain the tablet PC. The containing base contains the tablet PC at a desirable, ergonomically designed angle so that the user may operate the tablet PC with the maximum of comfort. In other words, the containing base is a very important containing element for the tablet PC.

Generally speaking, an support assembly (a support base or a extending base) for the tablet computer is a mechanical device to provide a mechanical engagement. There are, however, several disadvantages to such a mechanism. For example, in order to provide the mechanical engagement, the mechanism may have a very complex structure, and if one part of the structure is broken, the entire mechanism will be inoperable. Furthermore, since the mechanical structure of the support assembly always contains numerous parts, the support assembly assembles in a complex process, which induces a high manufacturing costs. In addition, a mechanical structure is more complicated to operate when disengaging the tablet computer from the support assembly.

It is therefore desirable to provide an improved containing assembly between a tablet computer and the extending base.

SUMMARY OF THE INVENTION

A main objective of the present invention is to provide an support assembly for engaging a portable computer.

Another objective of the present invention is to provide an support assembly for a portable computer for reducing the manufacturing costs of the support assembly.

Another objective of the present invention is to provide an support assembly for a portable computer for reducing the complexity of the support assembly to reduce the failure rate of the assembly.

Another objective of the present invention is to provide an support assembly for a portable computer for providing easy disengagement between the portable computer and the support assembly.

In order to achieve the above-mentioned objectives, the present invention discloses an support assembly for a portable computer, which comprises a portable computer, comprising a back panel, a plurality of first grooves in the back panel, and a plurality of first magnetic devices disposed in the first grooves respectively; a support board, comprising a back support board and a receiving groove, the receiving groove received the portable computer slantwise, the back support board comprising a plurality of second grooves and a plurality of second magnetic devices disposed therein, the back support board also providing a supporting force to support the portable computer; and a support base mounted with the support board, wherein the first grooves each corresponding to the second grooves respectively, and when the portable computer received in the receiving groove, the first magnetic devices are attracted by the corresponding plurality of second magnetic devices to attach the portable computer onto the support board.

Other objectives, advantages, and novel features of the invention will become more apparent from the following detailed description when taken in conjunction with the accompanying drawings.

DETAILED DESCRIPTION OF THE PREFERRED EMBODIMENT

Illustrative embodiments of the invention are described below. In the interest of clarity, not all features of an actual implementation are described in this specification.

Figure 1:
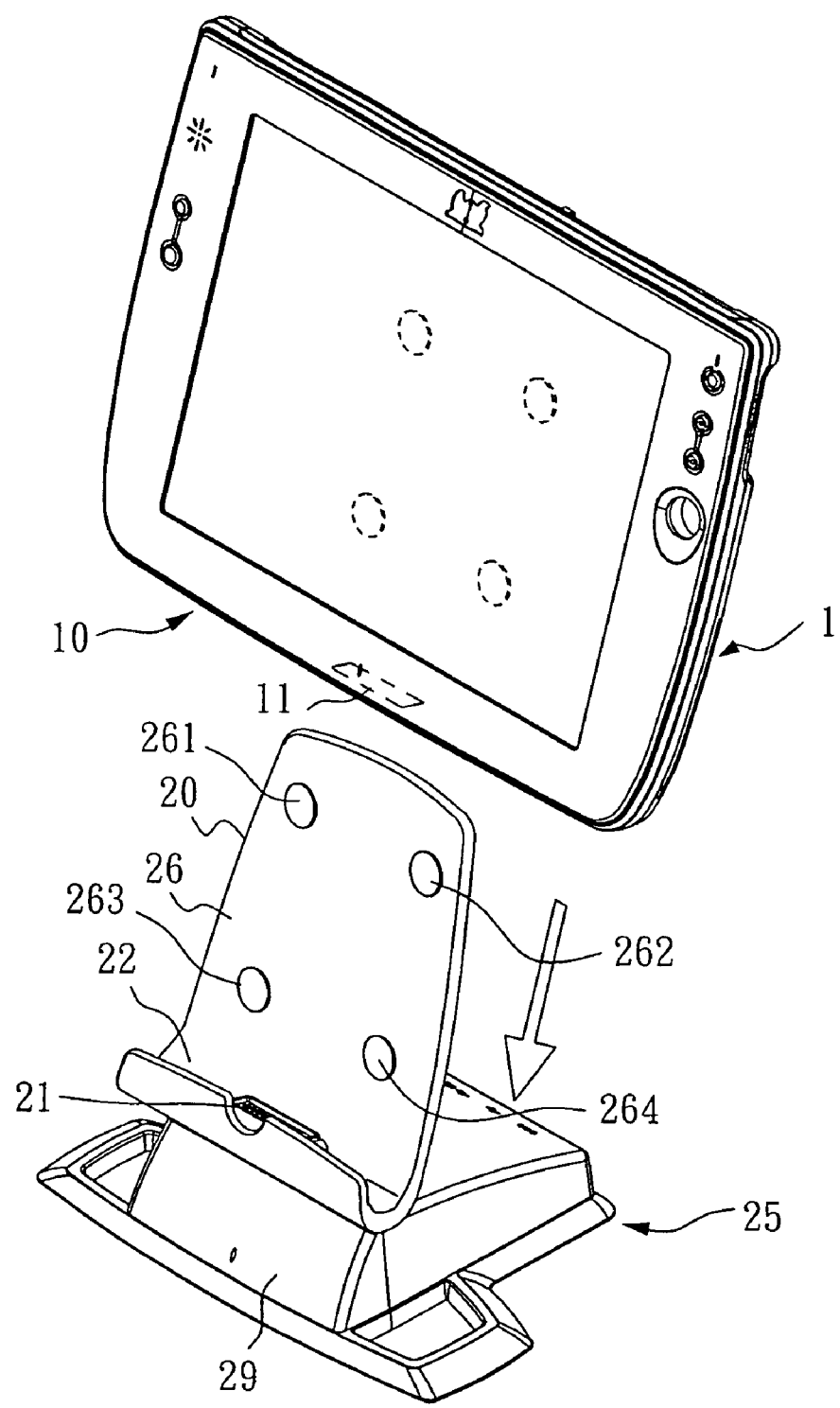
FIG. 1 is a front view of an embodiment according to the present invention.
Figure 2:
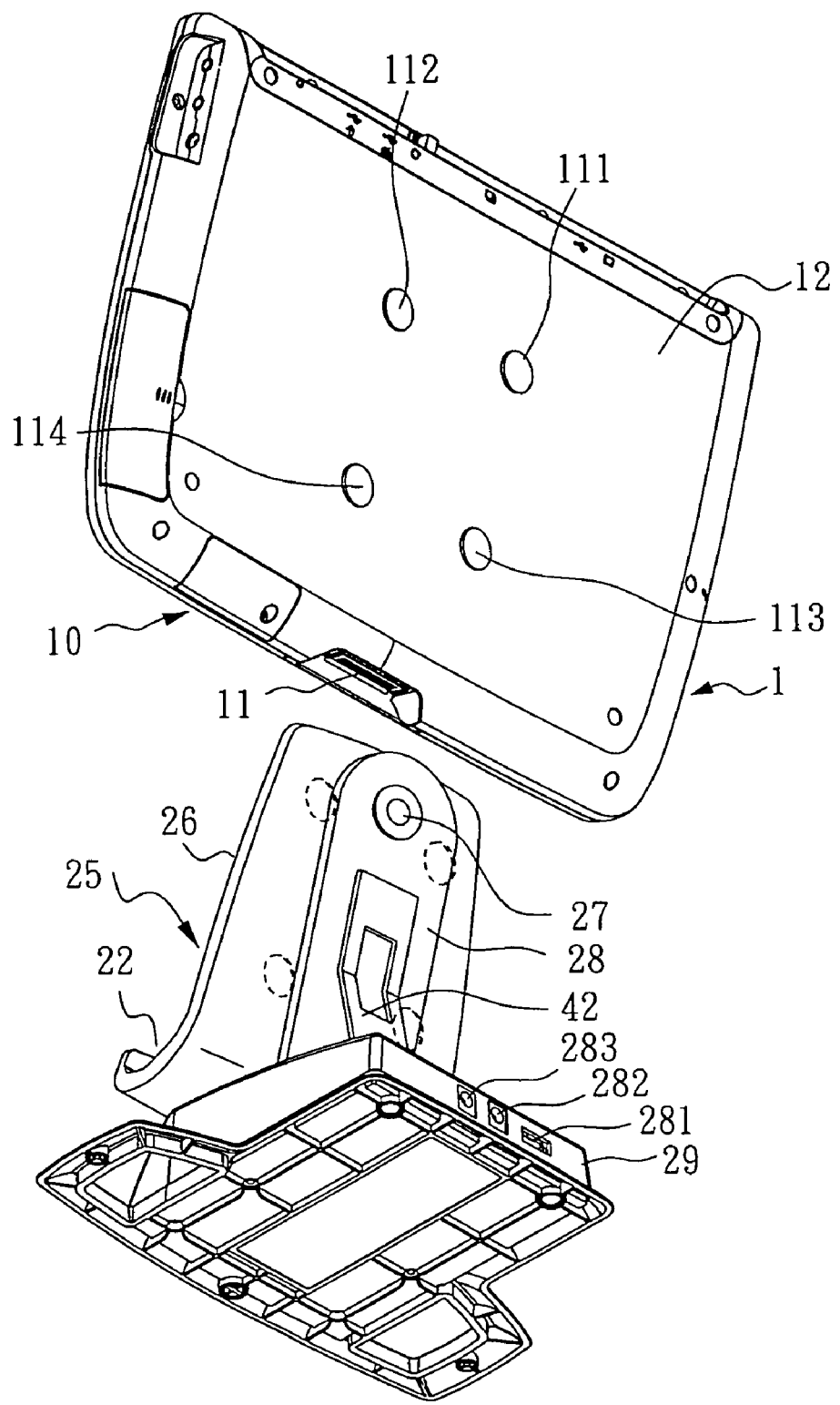
FIG. 2 is a back view of the embodiment according to the present invention.

Referring to FIG. 1. FIG. 1 is a front view of an embodiment according to the present invention. A portable computer 1 has several side edges, and a lower side edge 10 is taken as an example. A first connector 11 is positioned on the lower side edge 10. A back panel 12 of the portable computer 1 has a plurality of first grooves 111, 112, 113 and 114, as shown in FIG. 2. A magnetic device is deposited inside each first groove 111–114. The portable computer 1 is prior to a tablet PC.

An extending base 25 (an support assembly) comprises a support board 20, a support shelf 28 and a support base 29. The support shelf 28 is connected to and supported by the support base 29. The support shelf 28 further comprises a pivot 27, so the support shelf 28 can provide an appropriate support force for the support board 20. The pivot 27 can rotate the support board 20 to change a relative position between the support board 20 and the support shelf 28. Thus, an angle between the support board 20 and the support shelf 28 can be between 0° and 180°, depending upon the desires of the user. In addition, a support arm 42 is mounted on the support base 29, for providing greater support to the support shelf 28.

The support board 20 comprises a receiving groove 22 in the lower part of a back support board 26. The back support board 26 has a plurality of second grooves 261, 262, 263 and 264. A second magnetic device is deposited inside each second groove 261–264, and each second groove 261–264 position corresponds to one first groove 111–114 position. For example, the second groove 261 corresponds to the first groove 111, the second groove 262 corresponds to the first groove 112, the second groove 263 corresponds to the first groove 113 and the second groove 264 corresponds to the first groove 114. It is understood that the first grooves 111–114 and the second grooves 261–264 are not just numerically identical, but they are also positioned in a manner corresponding to each other. The second grooves 261, 262, 263 and 264 are placed along the four corners of the back support board 26.

When the portable computer 1 is placed in the extending base 25, the first magnetic devices deposited in the first grooves 111–114 and the second magnetic devices deposited in the second grooves 261–264 generate a mutual magnetic attraction. The portable computer 1 is thus attracted to an appropriate position on the back support board 26 (according to the positions of the first grooves 111–114 and second grooves 261–264). The containing groove 22 is fully capable of containing the weight of the portable computer 1. Therefore, with the combination of the magnetic attraction and the supporting force of the containing groove 22, the portable computer 1 is assembled on to the extending base 25.

If a user wishes to disengage the portable computer 1 from the back support board 26, the user just needs to apply a force on the portable computer 1 that is opposite to, and greater than, the magnetic attraction to move the portable computer 1 away from the back support board 26, and then lift the portable computer 1 up to leave the containing groove 22. In this manner, the assembly between the portable computer 1 and the back support board 26 is released.

An elastic material may be covered on the surface of the containing groove 22 and the back support board 26, such as plastic soft pad, to reduce jarring between the portable computer 1 and the extending base 25.

In addition, a second connector 21 is positioned in the containing groove 22, and a plurality of connectors are positioned on the extending base 25, such as a USB (Universal Series Bus) connector 281, a keyboard connector 282 and a mouse connector 283, as shown in FIG. 2. However, various connectors can be applied to the present invention, and are not limited to only those within this description. The USB connector 281, the keyboard connector 282 and the mouse connector 283 are electrically connected to the second connector 21. When the portable computer 1 is assembled into the extending base 25, the first connector 11 is electrically connected to the second connector 21, and so the portable computer 1 can receive electronic signals from a USB, a keyboard or a mouse.

Not only does the extending base 25 of the present invention have a simple structure, an easy assembling process, and low manufacturing costs, but the extending base 25 also provides a strong support force for the portable computer 1.

The invention has been described using exemplary preferred embodiments. However, for those arts in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

Although the present invention has been explained in relation to its preferred embodiment, it is to be understood that many other possible modifications and variations can be made without departing from the spirit and scope of the invention as hereinafter claimed.

What is claimed is:

1. A support assembly for a portable computer, comprising:
    a portable computer, comprising a back panel a plurality of first grooves in the back panel, and a plurality of first magnetic devices disposed in the first grooves respectively;
    a support board comprising a back support board and a receiving groove, the receiving groove received the portable computer slantwise, the back support board comprising a plurality of second grooves and a plurality of second magnetic devices disposed therein, the back support board also providing a supporting force to support the portable computer; and
    a support base mounted with the support board, wherein the first grooves each corresponding to the second grooves respectively, and when the portable computer received in the receiving groove, the first magnetic devices are attracted by the corresponding plurality of second magnetic devices to attach the portable computer onto the support board.

2. The support assembly as claimed in claim 1, wherein the portable computer has a first connector disposed on at least one edge of the portable computer, the receiving groove has a second connector, and the support base has at least one electric connector electrically connected to the second connector, and when the portable computer received in the receiving groove of the support board, the first connector is electrically connected to the second connector.

3. The support assembly as claimed in claim 1 further comprises a support shelf, the support shelf used for supporting the support board and mounted on the support base.

4. The support assembly as claimed in claim 3, wherein the support shelf further comprises a support arm connected to the support base for supporting the support shelf.

5. The support assembly as claimed in claim 1, wherein the receiving groove of said support board receives a bottom section of the portable computer.

6. The support assembly as claimed in claim 3, wherein the support shelf further comprises a pivot pivoted to the support board that enables the support board to rotate to an angle.

7. The support assembly as claimed in claim 1, wherein an elastic material is covered on a surface of the back support board or the receiving groove.

* * * * *